July 26, 1966  L. ANKER-HOLTH  3,262,657

VTOL SHORT HOP AIRCRAFT

Filed April 29, 1965  3 Sheets-Sheet 1

INVENTOR
Leif Anker-Holth

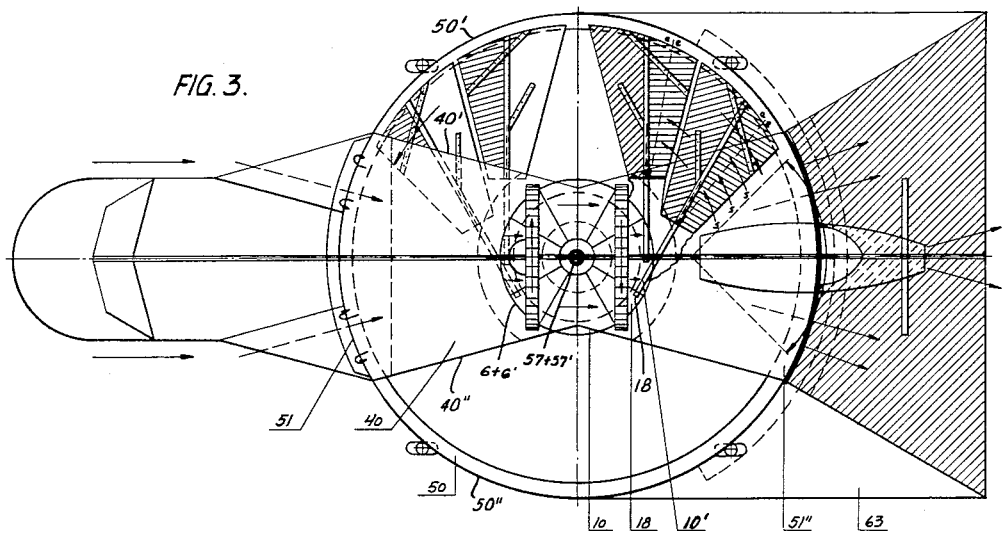
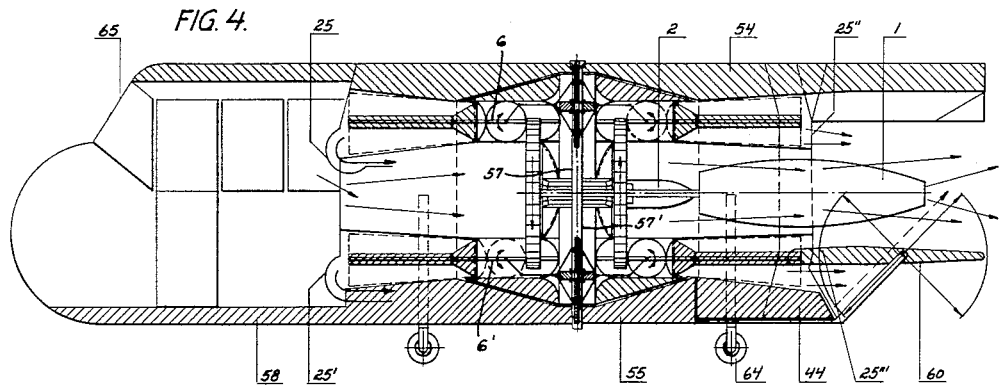
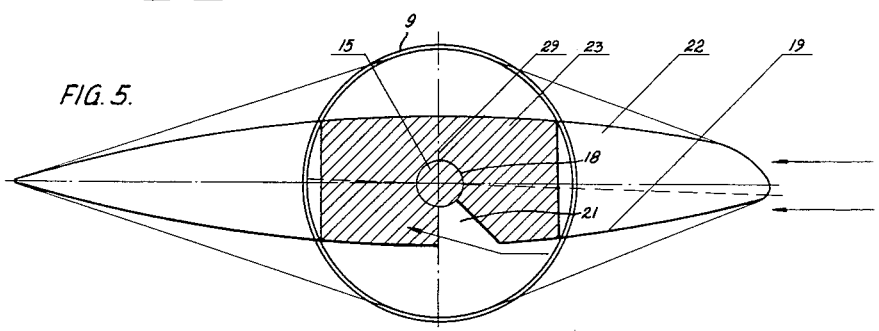

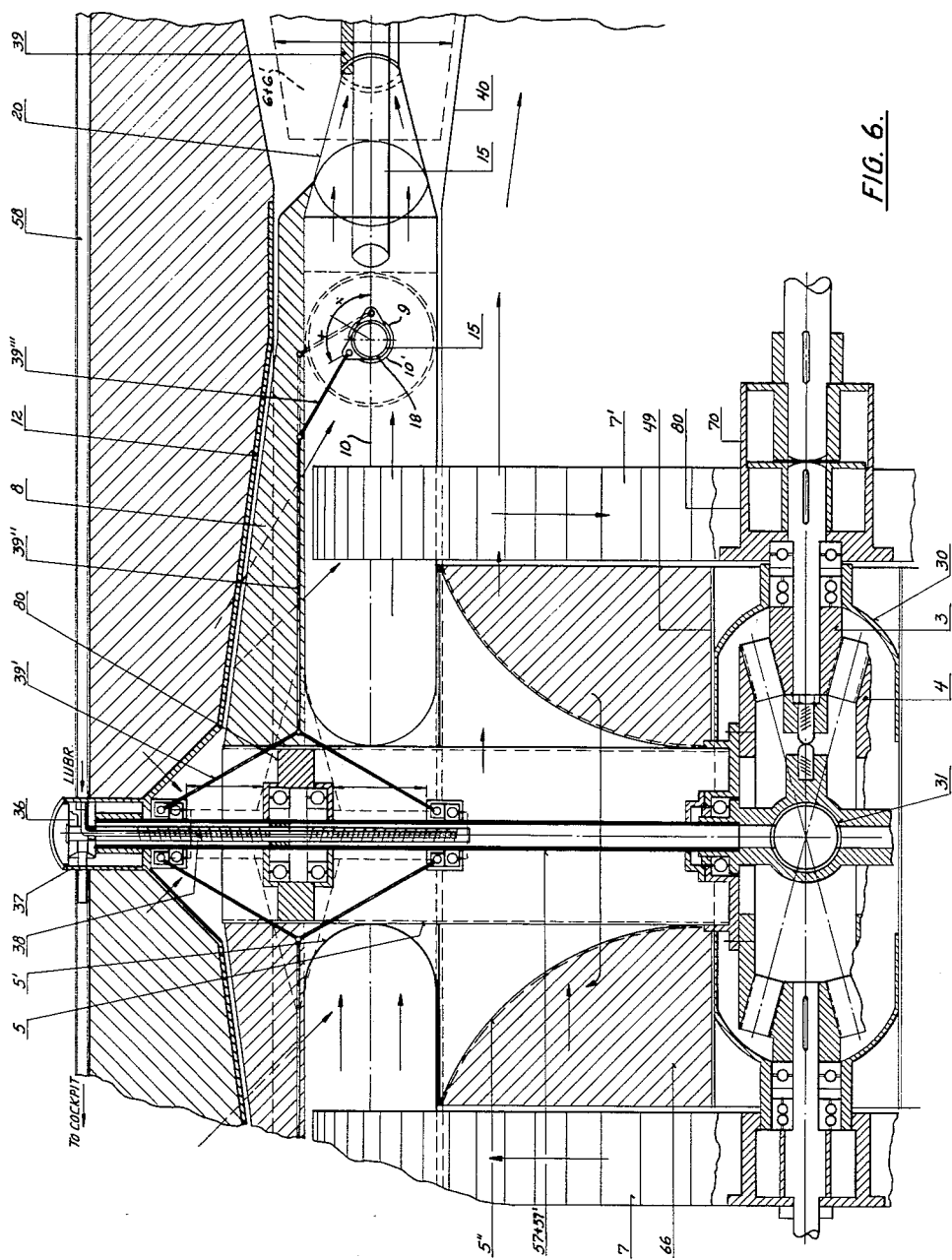

United States Patent Office 3,262,657
Patented July 26, 1966

3,262,657
VTOL SHORT HOP AIRCRAFT
Leif Anker-Holth, Oslo, Norway (% Sonya and Geo. Goforth, 15943 Londelius St., Sepulveda, Calif.)
Filed Apr. 29, 1965, Ser. No. 452,462
Claims priority, application Norway, Jan. 25, 1965, 150,234, Patent 157,489
9 Claims. (Cl. 244—23)

This invention relates to aircraft, more particularly but not exclusively to vertical take-off and landing short hop aircraft, having a novel supercirculation with an increased lift potential.

It is an object of this invention to build an aircraft that will fly higher and faster than other aircraft in the helicopter class.

It is another object of this invention to develop an aircraft that is automatically stable against the ever occurring moments of pitching, rolling and yawing.

It is a further object of this invention to produce an aircraft in which desired attitude changes are brought about by means of rotating members, as opposed to exposing static surfaces to the ambient air.

It is another object of this invention to build a compact aircraft that is inexpensive in initial cost, operation and maintenance, and can economically fly on a cushion of air near the ground or over water without turbulence.

It is another object of the invention to be able to brake fast while descending fast.

It is another object of this invention to build an aircraft that can go straight to goal in all kinds of normal weather including cross-wind.

It is still another object of this invention to build an aircraft that is safe, that can hover at zero forward speed and stop at any time during transition in either direction with precision and safety and in the event of engine failure can auto-rotate safely to the ground.

Other objects of this invention will be evident in the detailed specification, by reference to the accompanying drawings, in which:

FIGURE 3 is a top plan view of FIGURE 1 showing two 12 blade counter-rotating rotors and two counter-rotating fans in conjunction with a two-duct unit;

FIGURE 4 is a side-elevation of FIGURE 1;

FIGURE 5 is a vertical longitudinal section of the rotor blade as seen along the blade shaft;

FIGURE 6 is a side elevation of the transmission, rotor and fan to be explained hereinafter.

Figure 1:
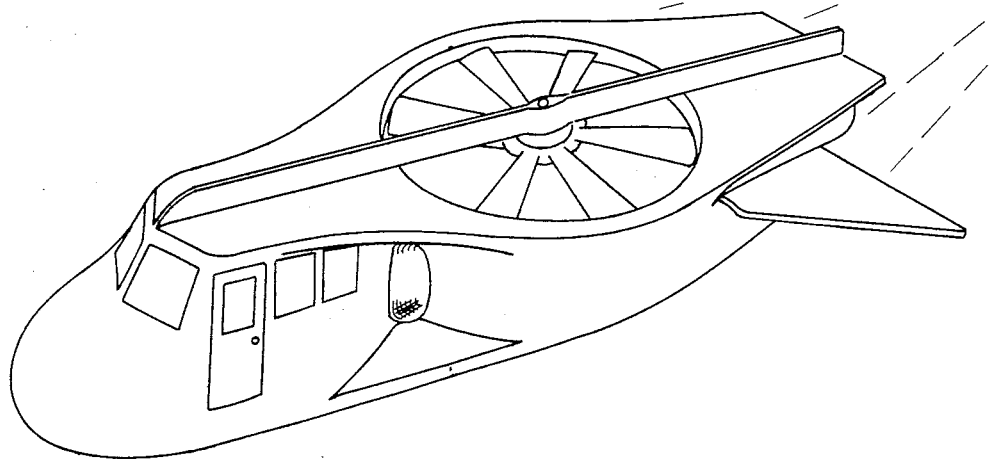
FIGURE 1 is a perspective view of a single engine two-duct unit aircraft, embodying my invention.
Figure 2:
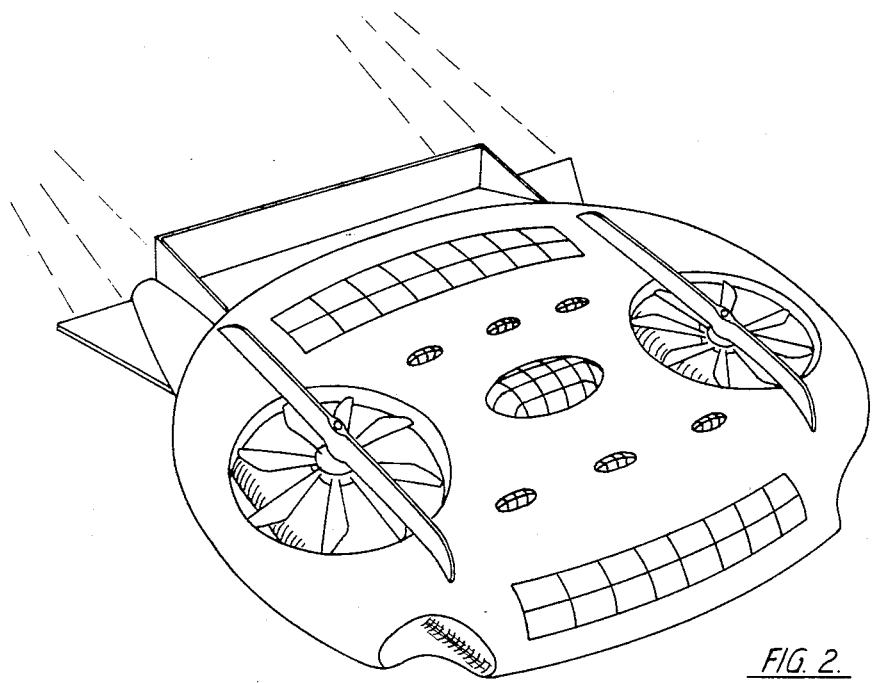
FIGURE 2 is a perspective view of a twin-engine aircraft each engine having a two-duct unit.

Referring to the drawings which show the preferred embodiment of this invention:

FIGURES 3 and 4 show a horizontal duct 40 extending longitudinally and medially through a larger vertical duct 50, thereby dividing 50 in two, to make a vertical downwash duct on each side of 40, whereby the inlets and outlets of said 40 and 50 are free and open while separately controlled, having a common center of gravity in the approximate center of gear box 30 (see FIGURE 6).

Extending longitudinally and medially over and under duct 40 are beams 54 and 55, with space between for two counter-rotating rotors 6 and 6' above and below 40 for vertical thrust, said 54 and 55 extending forward and aft of 40 to support cabin 65 in front and engine 1, elevator 60, rudder 44, fuel tanks 61 and baggage compartment 63 aft, with uprights in the form of tubing and plates forming a rigid framework.

In FIGURE 6, power plant 1, is a gas turbine engine symmetrically located aft in duct 40, extending longitudinally with drive-shaft 2, forwardly, to rotate short in-line shaft 2' in one direction via an over-running or one-way clutch 70, which free-wheels the rotating members and permits engine 1 to slow down or stop, incorporating a self-balancing mechanism 80 (not disclosed), a fan 7' and a small bevel gear 3 in centrally located gear box 30, which meshes with two larger gears 4 and 4', above and below, which mesh with oppositely in-line identical small gear 3' on shaft 2" with forward fan 7 rotatively secured to 2", while said 4 and 4' are secured to vertically directed transmission 5 consisting of cylinders 5 and curved walls 5', 5" and, which are welded or otherwise fastened to 5, which extends through upper and lower wall of duct 40, to rotate upper and lower rotors 6 and 6' to which 5 is secured; said gear box 30 is held in the approximate center of ducts 40 and 50. Fans 7 and 7' are substantially of the same diameter and capacity, though counter-rotating, directing the air in a rearwardly direction in 40, being supported transversely together with 30 by a framework extending between 7 and 7' to side walls 40' of 40, while supported vertically and medially by stator tube 57 and 57', which secure the framework upwardly and downwardly to 54 and 55 by means of a five-way fitting 31 in 30, and is covered by an airfoil skin 49.

Two hardened steel points, with rounded ends butting, one secured in fitting 31 and the other in in-line shaft 2', is for the purpose of minimizing engine vibration as shaft 2' is pressured while free-floating, against central support 57, the two said transmissions 5 with attached rotors 6 and 6' are each supported top and bottom medially by 57, using standard ball bearings.

A somewhat similar transverse plate of framework aft of 7' extending horizontally between walls 40' and 40", supports engine 1 forwardly while supported aft by a vertical upright, aft of 40 between 54 and 55 supporting engine 1 in a cradle.

Duct 40 in FIGURE 3 consists of walls 40' and 40" of said 40, each of which diverges outwardly from the vertical center-line at a desired angle past fans 7 and 7' to the inlet and outlet of said 40, respectively, being preferably curved but not necessarily, while the vertical 40' and 40" slope at a converging angle toward inlet and outlet corresponding with the rotor blade angle, upwardly and downwardly between said rotors at maximum pitch.

Vertical duct 50 consists of two somewhat similar curved outer walls or shrouds 50', extending upwardly and downwardly to shroud said rotors 6 and 6' when at minimum pitch, while the inner walls of 50 make the outer walls of 40, as 40' and 40".

Two diverter-shrouds, 25 and 25' extending on a level with said outer walls 50' of 50, sufficiently to streamline and shroud said foremost rotor blades to 6 and 6', when the angle of incidence is at a minimum for sustaining flight, said blades being exposed to the ambient air at maximum pitch, thereby increasing the air supply necessary for optimum lift.

The ram-air from 7 and 7' in passing over and under tangentially slanting blades of 6 and 6' greatly augments the lift of said blades at maximum pitch.

As said airstream passes through said 40, it feeds the intake of engine 1, cooling it before supplying the jet thrust with sufficient warmed air to improve the economy of said thrust, whether hovering or traveling at top speed.

FIGURE 3 shows two adjacent blades of two twelve-bladed rotors 6 and 6' in duct 50 above and below 40. It is evident that any desired number of blades may be used, but for practical purposes only one rotor blade is here described, since the blades are substantially similar.

The rotor consists of a sufficiently large diameter hub 8, to extend down over fans 7 and 7' as an inverted plate, with a flat annular outer platform 10, sufficiently wide to support a plurality of blades, having their medially directed shafts secured to hub 8, tangentially and rotatively in a bearing-sleeve 10', by nut 18, to which pitch control mechanism 39" is secured, consisting of a series of arms, 39', 39", and 39"', as shown in FIGURE 6, leading to static vertical tube 38, having right and left threads whereby said arms, being rotatively connected, activated from cock-pit via large and small bevel gears 36 and 37, to rotate said blade shaft 15 in an arc covering positive and negative pitch control.

Inside of hub 8 are circular openings 9, for air to pass in a substantially straight line from the upper and lower segment of 7 and 7', so that 9 is symmetrically directioned with shaft 15, whereby platform 10 divides 9 into an upper and lower half, with walls of 9 interlaced in a closed circle, with the top of 8, whereby the air passing through said 7 and 7', is deflected into the blade-openings 9 from the inside of 8 and also passes over the top of the passing blades, directed by 5' between 7 and 7', and also into rearwardly passing openings 9, past 7'.

Much of the air entering the blade-openings is drawn through holes and slits made in the double-wall top 8 and 12 (No. 12 may or may not be used), with vanes welded between in logarithmic spirals leading toward each blade-opening. The blades also have holes and slits above and below at desired intervals in the skin, more specifically along the tip rib, which improves the laminar flow over the plate leading edge tip, tending to prevent turbulence, where potential lift is greatest.

Said shaft 15 extends medially through the full length of the blade, limited by curved wall 50' of 50, said 15 having a steel plate welded and extending on a slant downwardly to the lower airfoil contour of the blade, where it has a bend along the approximate aerodynamic centerline, continuing forwardly to complete the airfoil contour of the underside of the blade. The skin 22 is wrapped around the framework, consisting of one or more ribs, 23, also welded to 15, with bends for securing the skin 22 to 23, said skin bending all the way around said framework, leaving an opening or channel 21 along the aerodynamic centerline, whereby the weight of the aircraft forces the air into the hollow blade along said channel, being forced along the trailing edge toward the tip trailing edge by the centrifugal force of rotation.

At the same time, intermittently with each rotation, a very much faster ram-air is forced into the blade, activated by fans 7 and 7' through the blade-opening, which upon meeting with the resistance of the air already in the trailing edge, will follow the lines of least resistance along the inner leading edge, all the while speeding up the air along the trailing edge side, the two airstreams existing as one on a slant downwardly at the tip, the reaction giving thrust to the blade, while the downwardly slanting airstream gives dynamic lift in the form of a circular downwash pillow of air through the two ducts to 50, while the outside of the blade gives the "wake" downwash through the two ducts medially, between the upper and lower rotors.

Since the tip speed of the fans is many times the speed of the rotor hub, the momentum of the air is proportionately greater, thereby speeding up the air in the trailing edge, augmenting the lift.

From the foregoing and following explanation it will be readily understood, that in accordance with aerodynamic principles since the blades take up most of the space not taken up by the central hub 8, there is little chance of back-pressure forcing its way back up said ducts 50 and 40, with air entering the blade as it rotates, the air passing rearwardly will be slowed down by the air entering the blade through said channel, whereby the laminar airflow will be maintained without turmoil, with an increased angle of incidence of the blade made possible.

As the blades pass over and under duct 40, the lift is greatly augmented by the ram-air drawn rearwardly by 7 and 7', which also increases the total air entering the ducts to 50 on each side of 40.

In passing over and under 40 the air is swept radialward leveling out any uneven distribution of air over the disk area of 50, thereby automatically tending to eliminate pitching moments. Similarly the air passing through 40 also tends to eliminate pitching moments.

The function of spreading and impinging the air as it enters 40 to pass 7 and 7' centrally and again spreading and expanding as it discharges from 40 in combination with two said vertical downwash ducts, automatically tends to eliminate rolling moments while the counter-rotating members 7 and 7' and 6 and 6' tend to eliminate yawing, pitching and rolling moments, whereby the aircraft is autostabilized in all three axes at all times during flight, reducing the mechanical handling to manipulation of the elevator and rudder.

In FIGURE 4 the elevator 60 consists of a substantially airfoil fan-shaped horizontally displosed plate, extending approximately on a level or above the level of rotor 6', with its diverging sides somewhat in-line with the diverging aft sides of 40', having a centrally located transverse tubing around which it rotates by standard means via controls contained in a tubing contained in beam 55.

In FIGURE 4 the rudder 44 consists of a vertical plate located in 55, rotatably secured or hinged to 57', activated by the airstream from fans 7 and 7', used for yawing and leveling up the craft, during flight, and for turning on its fourwheel under-carriage in the hangar or on the ground.

A specific form of my invention is above described, but it is to be understood that various changes in details of construction omission and combination of parts may be made therein as well as in the formation and arrangement of them, without departing from the scope of the invention as set forth in the accompanying claims.

What I claim and desire to secure by Letters Patent is:

1. An aircraft having a fuselage, two somewhat identical fans, two somewhat identical rotors, a power source, a gear box, a transmission, a rudder, an elevator, a fuel tank, controls, in a combination with one or more units consisting of a horizontally disposed duct, extending medially through a larger vertical duct, thereby dividing the latter in two, forming a half-moon downwash on each side of said horizontal duct, all three ducts having free and open inlets and outlets for directing three independent airstreams, one rearwardly and two downwardly, respectively, said ducts having a common center of gravity, located substantially in the center relative to said inlets and outlets, with two somewhat identical counter-rotating fans located equidistant forward and aft of said center, directing the air rearwardly in said horizontal duct, with two somewhat identical counter-rotating rotors equidistant from said center vertically, directing the air downwardly in said half-moon ducts, said rotors and fans being activated by an adequate power source, said rotors having each a large diameter hub supporting a plurality of hollow lightweight blades, tangentially and rotatively secured to a horizontal circular, flat-rim platform, which is a part of said hollow hub, permitting said fans to extend up inside said hubs to deliver ram-air through the hub-annular openings into the hollow blades, where, meeting with resistance offered by air already in the trailing edge of the blade, having entered along the underside aerodynamic-line channel, the latter slower-moving air activated by the weight of the aircraft and the centrifugal force of rotation, while the hub air entering the blade, follows along the leading edge, speeding up the trailing edge air to exit together at the tip trailing edge on a slant downwardly as a combined downwash directed by the curved walls of said half-moon ducts, to form a pillow of air beneath the aircraft, existing with a slower-moving inner downwash from the outside of said rotor blades, the total downwash tending to steady the aircraft laterally, while producing lift, said horizontal duct having curved sides, diverging outwardly past said fans from center-line to inlet and outlet, with sides of said duct having a some-what fan-shaped channel, leading in a somewhat horizontal line to the foremost fan, and a somewhat similar channel leading from the rear fan in a somewhat horizontal line of said duct, whereby air is drawn through said fan being directed between said fans, to exit aft of said duct, after passing over and under passing rotor blades in front under the hub medially, and over and under said passing blades of said rotor, whereby the horizontal airstream from said fans meets with the greatest resistance when the rotor blades are at maximum pitch, thereby greatly augmenting the lift, said horizontal duct having a longitudinal beam extending medially across top and bottom with room for rotors between duct and beam, top and bottom, with supporting uprights forward and aft of inlet and outlet, respectively, with said vertical stator supporting tube medially disposed to make a rigid framework supporting said medially located gear box in said duct, and said transmission between said gear box and beams above and below, said elevator acting as a single unit for nose up or down attitude change in conjunction with said vertical rudder, hinged to said stator tube and extending under said duct rearwardly, immediately above said lower beam, or dispensing with said rudder and using a double or split-fan shaped elevator, which combines lateral attitude control with directional, using standard means of control.

2. An aircraft as defined in claim 1 and further characterized, whereby said horizontal duct extends medially through said vertical duct forming said half-moon ducts on each side of said horizontal duct, for conducting three independent airstreams, one rearwardly and two downwardly, respectively, said ducts having said common center of gravity, located substantially in the center of gravity relative to said inlet and outlet.

3. An aircraft as defined in claim 1 and further characterized, whereby said counter-rotating fans in combination with said counter-rotating rotors, driven from a common gear box, centrally located in said center of gravity, having meshing drive-gears of sizes commensurate with their desired speeds, activated by said power plant of adequate power such as one or more gas turbine engines.

4. An aircraft as defined in claim 1 and further characterized, whereby said transmission consisting of a combination of a large diameter lightweight vertical cylinder to which lightweight curved walls are welded or otherwise secured, including said rotor double-wall hub top with vertical vanes between, with holes and slits in said hub top and said walls for drawing air from above and deflecting same into side and rear said blade-openings, activated by said fans which extend up inside said hub.

5. An aircraft as defined in claim 1 and further characterized, whereby the laminar flow is activated by suction through holes and slits in said hub double-wall cover, by said fans, whereby air is drawn through said holes and slits in the double-wall cover by said fans and distributed by said upper curved cylinder-walls of said transmission into said blade-openings, said holes and slits in said cover being distributed over said cover so as to assist the laminar flow to the blades.

6. An aircraft as defined in claim 1 and further characterized, whereby said fans extend up inside said hollow hubs to deliver ram-air through said hub annular openings into said hollow blades.

7. An aircraft as defined in claim 1 and further characterized, whereby said blades have a channel opening along the underside aerodynamic-line, whereby air is forced into said blade via said channel, activated by the weight of the aircraft and the centrifugal force of rotation, to follow along the trailing edge of said blade, while said faster-moving fan air meets with the resistance of said channel air, and follows along the leading edge, all the while speeding up said channel air to exit together at the tip trailing edge as a combined downwash, directed by the curved wall of said half-moon duct, to form a pillow of air beneath the craft, said faster moving air supplying less than half the blade openings at one time, producing a pressure followed by suction in the said blade with each rotation, assisted by holes and slits at desired points in the blades.

8. An aircraft as defined in claim 1, and further characterized by said two half-moon ducts located on each side of said horizontal duct, having said downwash airstream of somewhat similar capacity and downward thrust in combination with the circulation produced in said horizontal duct, said horizontal duct having said curved walls diverging outwardly past said fans from center-line to inlet and outlet, with each side vertically converging from the underside of said hub on a slant to said inlet and outlet corresponding with the angle of maximum pitch of said rotor blades, passing over and under said horizontal duct, whereby the air spreads as it enters large opening between said rotor diverter-shrouds being impinged toward the fans and spreading and expanding from the fans as it exits, whereby said two downwash airstreams between two said parallel rotors, separated by said horizontal duct as described, produces lateral stability in all three axes automatically, leaving for the pilot to manipulate attitude changes, activated by rotating members.

9. An aircraft as defined in claim 1 and further characterized, whereby said vertical stator supporting tube, medially disposed through said horizontal duct, securing medially said gear box, extending through two said cylinder transmissions including said rotors, rotationally secured in both ends, said stator tube being statically secured to an uppermost and lowermost beam each extending longitudinally above and below said horizontal duct, with uprights at inlet and outlet, making said rigid framework, to which said fuselage, said power source, rudder, elevator, fuel tank, controls are secured.

References Cited by the Examiner

UNITED STATES PATENTS

| | | | |
|---|---|---|---|
| 2,728,537 | 12/1955 | Elkins | 244—23 |
| 2,734,699 | 2/1956 | Lippisch | 244—23 |
| 2,863,621 | 12/1958 | Davis | 244—23 |
| 2,930,546 | 3/1960 | Wibault | 244—23 |
| 2,969,032 | 1/1961 | Pinnes | 244—23 |
| 3,048,353 | 8/1962 | Holmes | 244—23 |
| 3,182,929 | 5/1965 | Lemberger | 244—23 |

MILTON BUCHLER, *Primary Examiner.*

L. C. HALL, *Assistant Examiner.*